United States Patent
Li et al.

(10) Patent No.: US 11,162,029 B2
(45) Date of Patent: Nov. 2, 2021

(54) LIQUID CRYSTAL COMPOSITION, MANUFACTURING METHOD THEREOF, DISPLAY PANEL AND DISPLAY DEVICE

(71) Applicant: BOE TECHNOLOGY GROUP CO., LTD., Beijing (CN)

(72) Inventors: Rui Li, Beijing (CN); Pengju Zhang, Beijing (CN); Mingxing Liu, Beijing (CN); Haiyan Sun, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 64 days.

(21) Appl. No.: 16/387,004

(22) Filed: Apr. 17, 2019

(65) Prior Publication Data
US 2020/0063034 A1    Feb. 27, 2020

(30) Foreign Application Priority Data
Aug. 23, 2018    (CN) .......................... 201810966213.8

(51) Int. Cl.
G02F 1/1333 (2006.01)
C09K 19/44 (2006.01)
C09K 19/12 (2006.01)
C09K 19/20 (2006.01)
C09K 19/30 (2006.01)

(52) U.S. Cl.
CPC .............. *C09K 19/44* (2013.01); *C09K 19/12* (2013.01); *C09K 19/20* (2013.01); *C09K 19/3003* (2013.01); *C09K 19/3066* (2013.01); *C09K 2019/122* (2013.01); *C09K 2019/123* (2013.01); *C09K 2019/301* (2013.01); *C09K 2019/3009* (2013.01); *C09K 2019/3016* (2013.01); *C09K 2019/3019* (2013.01); *C09K 2019/3025* (2013.01)

(58) Field of Classification Search
CPC ........ C09K 19/44; C09K 19/12; C09K 19/20; C09K 19/3003; C09K 19/3066; C09K 2019/122; C09K 2019/123; C09K 2019/3009; C09K 2019/301; C09K 2019/3016; C09K 2019/3019; C09K 2019/3025; G02F 1/1333
USPC ................................................... 252/299.63
See application file for complete search history.

(56) References Cited

U.S. PATENT DOCUMENTS

| | | |
|---|---|---|
| 2007/0034830 A1 | 2/2007 | Heckmeier et al. |
| 2015/0307780 A1 | 10/2015 | Kawamura et al. |
| 2015/0337200 A1 | 11/2015 | Kawamura et al. |
| 2016/0326433 A1 | 11/2016 | Tojo et al. |

(Continued)

FOREIGN PATENT DOCUMENTS

| | | |
|---|---|---|
| CN | 1032435 A | 4/1989 |
| CN | 100480355 C | 4/2009 |

(Continued)

OTHER PUBLICATIONS

A Dictionary of Chemistry (6 ed.), Edited by John Daintith Oxford University Press 2008eISBN: 9780191726569 (Year: 2008).*
Dai et al., "Stability of foam and the effect of liquid crystal on it", (Institute of Physical Chemistry, Peking University) Chinese Journal of Applied Chemistry, China Academic Journal Electronic Publishing House http://www.cnki.net, 1989, pp. 79-82 with English translation (10 pages).

(Continued)

*Primary Examiner* — Geraldina Visconti
(74) *Attorney, Agent, or Firm* — Collard & Roe, P.C.

(57) ABSTRACT

Embodiments of the present disclosure provide a liquid crystal composition and its manufacturing method, a display panel and a display device. The liquid crystal composition includes: at least three organic compounds having a general formula of

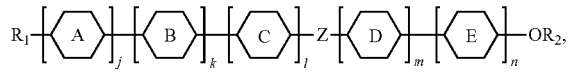

in which $R_1$ is selected from C1 to C12 alkyl or C2 to C12 alkenyl; $R_2$ is selected from C1 to C12 alkyl, C2 to C12 alkenyl or $CF_3$;

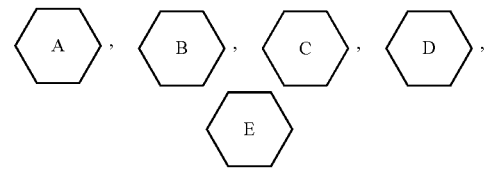

are independently selected from

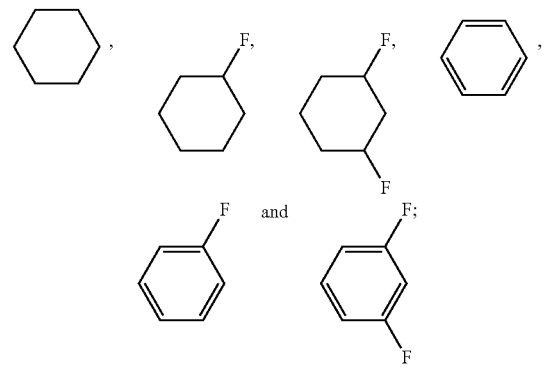

j, k and m are independently selected from 0, 1, 2 and 3; l and n are independently selected from 1, 2 and 3; and Z is selected from a single bond, C1 to C12 alkyl, C2 to C12 alkenyl, C2 to C12 alkynyl, $CF_2O$ or COO.

8 Claims, 1 Drawing Sheet

(56) References Cited

U.S. PATENT DOCUMENTS

| | | | |
|---|---|---|---|
| 2017/0107427 A1 | 4/2017 | Takahashi et al. | |
| 2017/0369418 A1* | 12/2017 | Tanaka | C09K 19/18 |
| 2018/0030351 A1* | 2/2018 | Takata | C09K 19/44 |

FOREIGN PATENT DOCUMENTS

| | | | |
|---|---|---|---|
| CN | 103086848 A | 5/2013 | |
| CN | 104628541 A | 5/2015 | |
| CN | 104736670 A | 6/2015 | |
| CN | 104812871 A | 7/2015 | |
| CN | 105602575 A | 5/2016 | |
| CN | 105849075 A | 8/2016 | |
| CN | 108165279 A | 6/2018 | |
| EP | 3 275 971 A1 | 1/2018 | |
| JP | H08-311080 A | 11/1996 | |
| JP | 2003-238960 A | 8/2003 | |
| JP | 6455511 B2 | 1/2019 | |

OTHER PUBLICATIONS

Zhang et al., "Effects of Oxygen on Viscosity of Nematic Liquid Crystal", Chinese Journal of Liquid Crystals and Displays, China Academic Journal Electronic Publishing House http://www.cnki.net, Oct. 2009, vol. 24 No. 5, pp. 640-644 with English translation (17 pages).

Liu et al., "Effect of Difluorooxymethylene Alkylbenzene on Properties of Low-Temperature Viscosity", Chinese Journal of Liquid Crystals and Displays, China Academic Journal Electronic Publishing House http://www.cnki.net, Aug. 2010, vol. 25, No. 4, pp. 490-493 with English translation (14 pages).

Dai et al., "Research on the Apply of Defoamer in Liquid Crystal Mixtures", Xi'an Ruilian Modern Electronic Chemicals Co. Ltd, China Academic Journal Electronic Publishing House http://www.cnki.net, Sep. 2008, pp. 32-36 with English translation (17 pages).

Chinese Office Action in Chinese Application No. 201810966213.8, dated Dec. 18, 2019 with English translation.

\* cited by examiner

LIQUID CRYSTAL COMPOSITION, MANUFACTURING METHOD THEREOF, DISPLAY PANEL AND DISPLAY DEVICE

The present application claims the priority of the Chinese Patent Application No. 201810966213.8 filed on Aug. 23, 2018, which is incorporated herein by reference as a part of the present application.

TECHNICAL FIELD

Embodiments of the present disclosure relate to a liquid crystal composition, its manufacturing method, a display panel and a display device.

BACKGROUND

Liquid crystal material is widely used in a display, a light-emitting device, a sensor device and so on. With consumer's increasing demand for display technology, especially in the aspects of realizing fast response, reducing driving voltage and reducing power consumption, the liquid crystal material plays an important role in improving the performance of the liquid crystal display.

The liquid crystal material needs to have a good chemical stability, a thermal stability and a stability to an electric field and an electromagnetic radiation. In addition to the above stabilities, it would be advantageous for the liquid crystal material of a thin film transistor liquid crystal display (TFT-LCD) to have one or more of the following properties: a wide nematic temperature range, a suitable birefringence anisotropy, a high resistivity, a good UV resistance, a high charge retention and a low steam pressure.

SUMMARY

At least one embodiment of the present disclosure provides a liquid crystal composition, and the liquid crystal composition comprises: at least three organic compounds having a general formula of

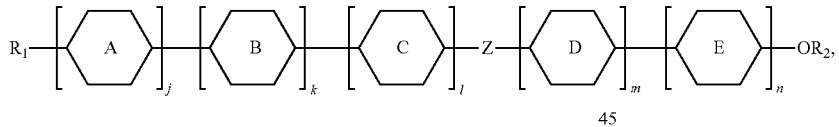

in which
$R_1$ is selected from C1 to C12 alkyl or C2 to C12 alkenyl;
$R_2$ is selected from C1 to C12 alkyl, C2 to C12 alkenyl or $CF_3$;

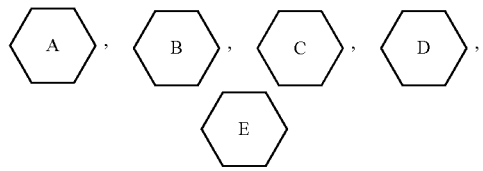

are independently selected from

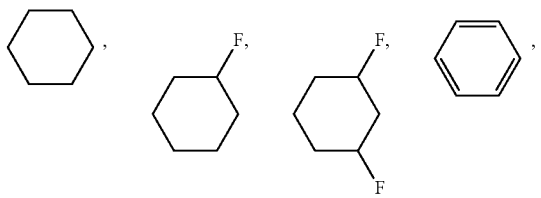

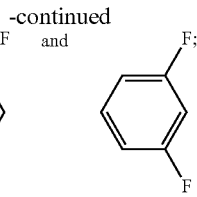

j, k and m are independently selected from 0, 1, 2 and 3;
l and n are independently selected from 1, 2 and 3; and
Z is selected from a single bond, C1 to C12 alkyl, C2 to C12 alkenyl, C2 to C12 alkynyl, $CF_2O$ or COO.

For example, in a liquid crystal composition provided by at least one embodiment of the present disclosure, $R_1$ is selected from C1 to C3 alkyl or C2 to C3 alkenyl; $R_2$ is selected from C1 to C2 alkyl or $CF_3$;

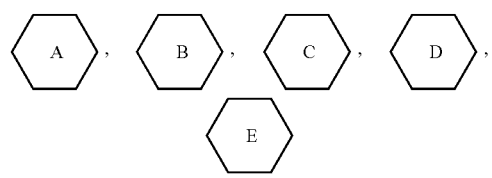

are independently selected from

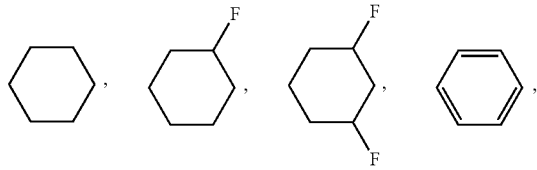

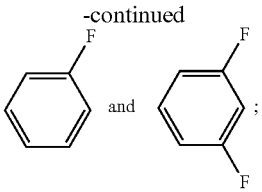

j, k and m are independently selected from 0 and 1;
l and n are 1; and
Z is selected from a single bond or $CF_2O$.

For example, in a liquid crystal composition provided by at least one embodiment of the present disclosure, the liquid crystal composition comprises:

having a mass percentage of about 15%;

having a mass percentage of about 15%;

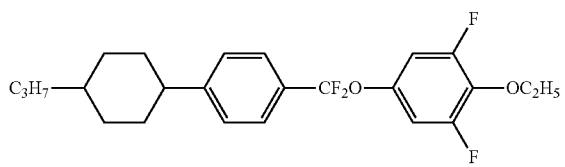

having a mass percentage of about 20%;

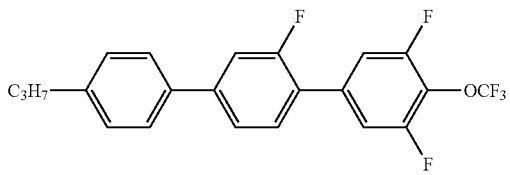

having a mass percentage of about 15%;

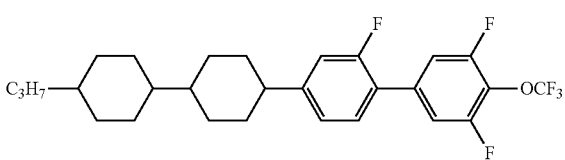

having a mass percentage of about 10%;

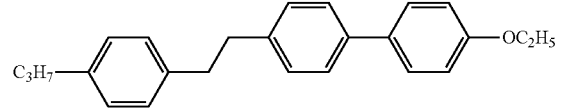

having a mass percentage of about 15%; and

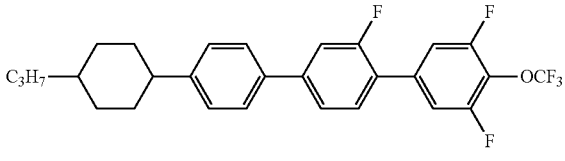

having a mass percentage of about 10%.

For example, in a liquid crystal composition provided by at least one embodiment of the present disclosure, the liquid crystal composition comprises:

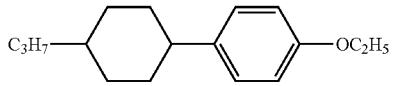

having a mass percentage of about 20%;

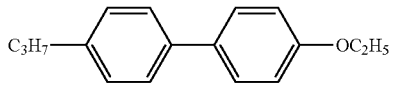

having a mass percentage of about 20%;

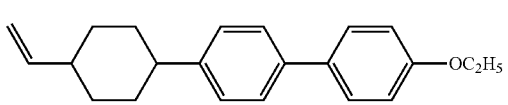

having a mass percentage of about 15%;

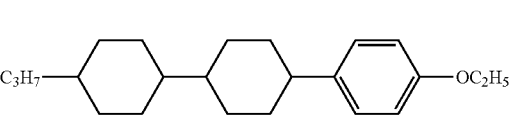

having a mass percentage of about 15%;

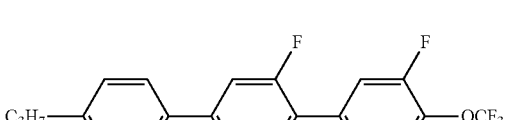

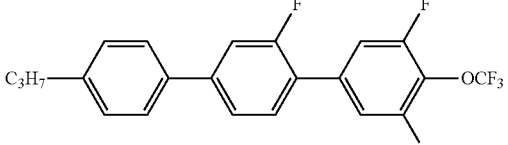

having a mass percentage of about 15%; and

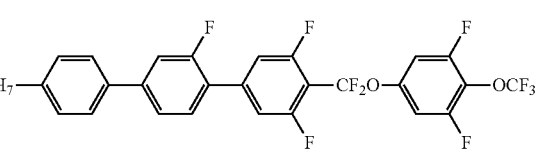

having a mass percentage of about 15%.

For example, in a liquid crystal composition provided by at least one embodiment of the present disclosure, the liquid crystal composition comprises:

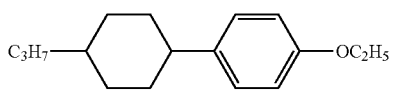

having a mass percentage of about 40%;

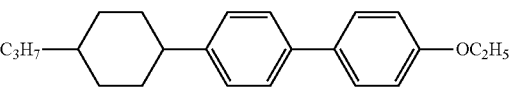

having a mass percentage of about 30%; and

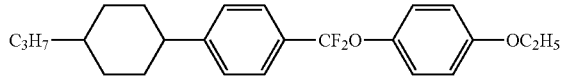

having a mass percentage of about 30%.

For example, in a liquid crystal composition provided by at least one embodiment of the present disclosure, the liquid crystal composition comprises:

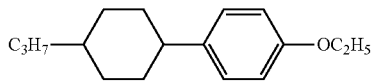

having a mass percentage of about 30%;

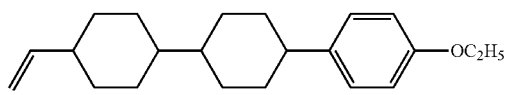

having a mass percentage of about 30%;

having a mass percentage of about 20%; and

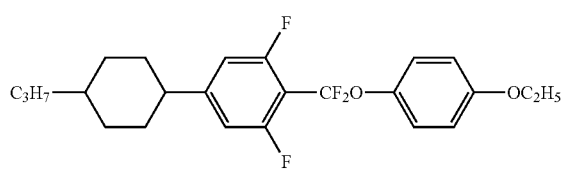

having a mass percentage of about 20%.

For example, in a liquid crystal composition provided by at least one embodiment of the present disclosure, the liquid crystal composition comprises:

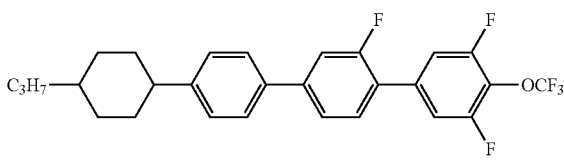

having a mass percentage of about 25%;

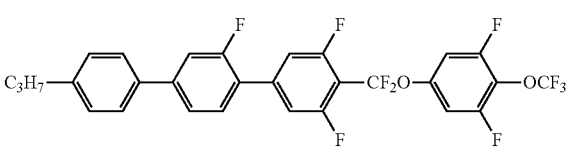

having a mass percentage of about 25%;

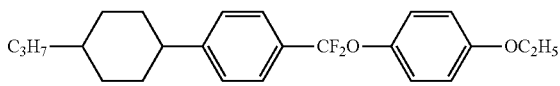

having a mass percentage of about 30%; and

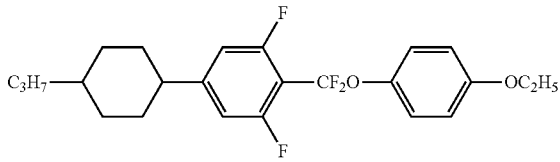

having a mass percentage of about 20%.

For example, in a liquid crystal composition provided by at least one embodiment of the present disclosure, the liquid crystal composition comprises:

having a mass percentage of about 15%;

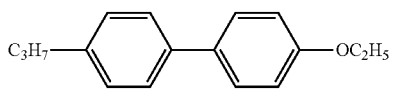

having a mass percentage of about 15%;

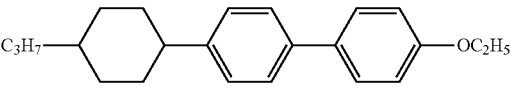

having a mass percentage of about 20%;

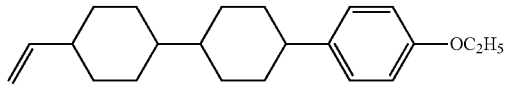

having a mass percentage of about 10%;

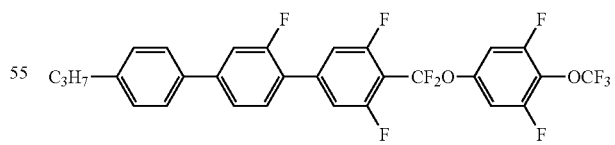

having a mass percentage of about 20%; and

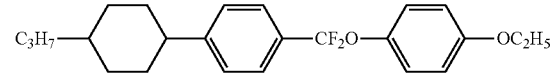

having a mass percentage of about 20%.

For example, in a liquid crystal composition provided by at least one embodiment of the present disclosure, the liquid crystal composition comprises:

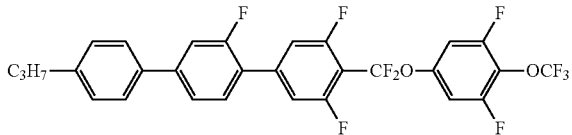

having a mass percentage of about 15%;

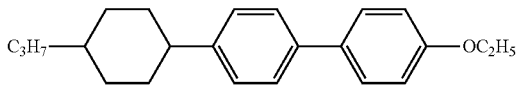

having a mass percentage of about 15%;

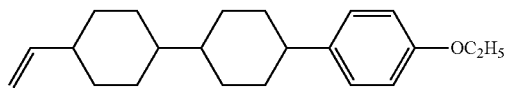 [SMILES: C=CC1CCC(C2CCC(c3ccc(OCC)cc3)CC2)CC1]

having a mass percentage of about 20%;

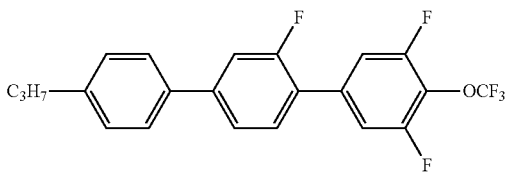

having a mass percentage of about 15%;

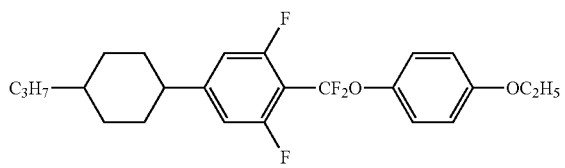

having a mass percentage of about 10%;

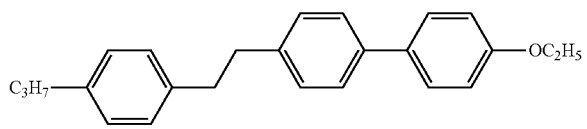

having a mass percentage of about 15%;

having a mass percentage of about 10%; and

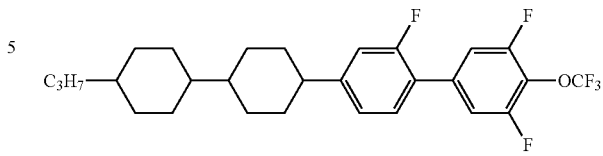

having a mass percentage of about 10%.

For example, in a liquid crystal composition provided by at least one embodiment of the present disclosure, the liquid crystal composition has a fluid viscosity of from about 8 cP to 15 cP.

For example, in a liquid crystal composition provided by at least one embodiment of the present disclosure, the liquid crystal composition has a fluid viscosity of from about 9 cP to 13 cP.

For example, in a liquid crystal composition provided by at least one embodiment of the present disclosure, the liquid crystal composition has a fluid viscosity of about 10 cP, 11 cP or 12 cP.

At least one embodiment of the present disclosure further provides a method of manufacturing any liquid crystal composition described above, and the method comprises: mixing components in the liquid crystal composition and heating to obtain the liquid crystal composition.

For example, in a method provided by at least one embodiment of the present disclosure, the liquid crystal composition includes no defoaming agent.

At least one embodiment of the present disclosure further provides a display panel, and the display panel comprises any one of the liquid crystal compositions described above.

At least one embodiment of the present disclosure further provides a display device, and the display device comprises any one of the display panels described above.

BRIEF DESCRIPTION OF THE DRAWINGS

In order to clearly illustrate the technical solution of embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
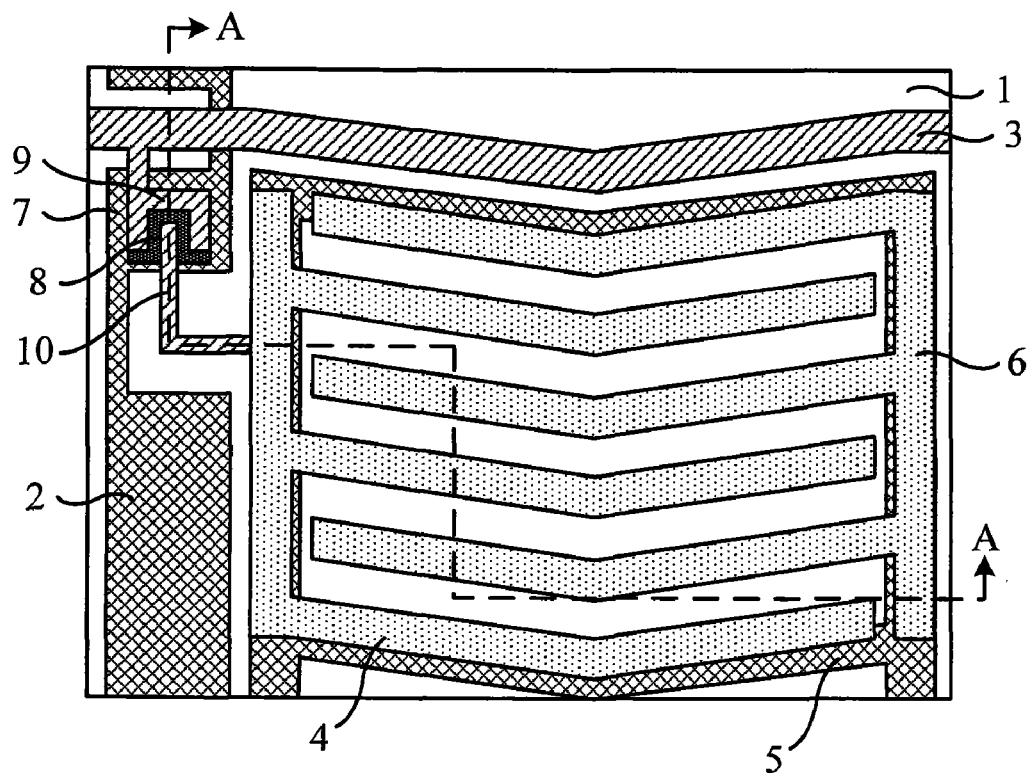
FIG. 1 schematically shows a top view of a partial structure of an array substrate in an IPS-mode liquid crystal panel provided by an embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and claims of the present application, are not intended to indicate any sequence, amount or importance, but to distinguish various components. The terms "comprises," "comprising," "includes," "including," etc., are intended to specify that the elements or the objects stated before these terms encompass the elements or the objects listed after these terms as well as equivalents thereof, but do not exclude other elements or objects.

If there is gas in the liquid crystal during manufacturing a liquid crystal display panel, bubbles would be generated upon assembling two substrates of the liquid crystal display panel in a vacuum condition. Bubbles result in the decrease of the yield of the final products.

At present, a first method to remove bubbles is to add defoamers to the liquid crystal. For example, conventional defoamers include emulsified silicone oil, high-carbon alcohol fatty acid ester complex, polyoxyethylene polyoxypropylene pentaerythritol ether, polyoxyethylene polyoxypropylene amine ether, polyoxypropylene glyceryl ether, polyoxypropylene polyoxyethylene glyceryl ether and polydimethylsiloxane and so on. However, the defoamer is easy to aggregate, so that the defoamer is not uniformly dispersed in the liquid crystal, which leads to a problem of poor display such as Mura. Furthermore, the defoamer in the liquid crystal reduces a voltage holding ratio (VHR) and a resistivity of liquid crystal, and increases ion density, which results in the problem of reducing the reliability of the liquid crystal.

A second method to remove the bubbles is vacuum defoaming the liquid crystal before one drop filling (ODF). At present, vacuum oscillation defoaming of the liquid crystal is conducted in sections. That is to say, vacuuming for 20 minutes at 1000 Pa, vacuuming for 20 minutes at 100 pa, vacuuming for 20 minutes at 50 pa and vacuuming for 20 minutes at 30 Pa sequentially. The whole defoaming process takes 80 minutes. The defoaming process has a serious impact on the productivity of the assembling process.

At least one embodiment of the present disclosure provides a liquid crystal composition, and all the monomers in the liquid crystal composition contain an ether structure or an ether-like structure, which reduces the solubility of air and nitrogen in the liquid crystal composition. Bubbles are seldom generated in the process of assembling the two substrates of the liquid crystal display panel. Furthermore, the liquid crystal composition has a small surface tension and a small fluid viscosity, and the gas dissolved in the liquid crystal can easily escape under the vacuum condition. Thus, the efficiency of the assembling process is greatly improved, that is, the liquid crystal composition can achieve a good defoaming effect without adding any defoamer.

In the present disclosure, the fluid viscosity is measured as follows: taking about 2 mL of a sample for a liquid crystal composition, and measuring the fluid viscosity of the sample by a fluid viscometer. Clearing point of a liquid crystal composition is measured as follows: taking a trace sample (for example, 20 μL to 30 μL) of the liquid crystal composition on a slide glass and covering it with a coverslip, and using a MP90 Clearing Point Tester of Mettler Toledo to measure the clearing point of the liquid crystal composition. Rotational viscosity is measured as follows: siphoning a sample of a liquid crystal composition into a testing box with a thickness of about 20 μm, and then using INSTEC manufacturer's ALCT-IR1 equipment to measure the rotational viscosity.

At least one embodiment of the present disclosure provides a liquid crystal composition, and the liquid crystal composition comprises at least three organic compounds having a general formula of

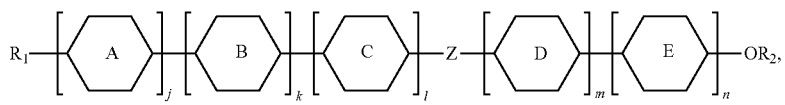

in which
$R_1$ is selected from C1 to C12 alkyl or C2 to C12 alkenyl;
$R_2$ is selected from C1 to C12 alkyl, C2 to C12 alkenyl or $CF_3$;

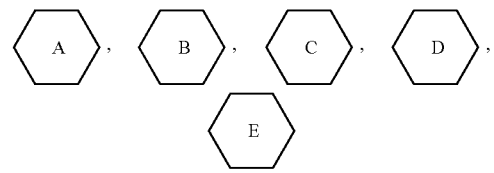

are independently selected from

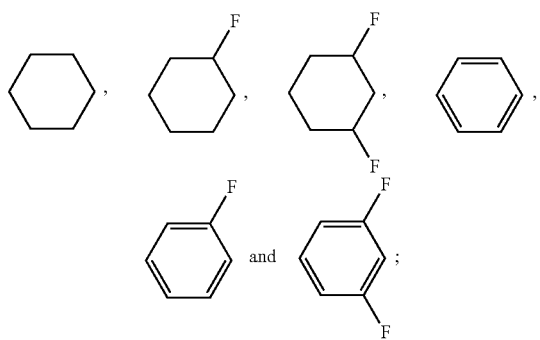

j, k and m are independently selected from 0, 1, 2 and 3;
l and n are independently selected from 1, 2 and 3; and
Z is selected from a single bond, C1 to C12 alkyl, C2 to C12 alkenyl, C2 to C12 alkynyl, $CF_2O$ or COO.

For example, R1 selected from C1 to C12 alkyl means that R1 is a straight chain alkyl with a carbon atom number of 1 to 12 or a cycloalkyl with a carbon atom number of 1 to 12.

For example, in a case that the second position or the third position of the benzene ring in the liquid crystal molecule is substituted with a fluorine atom, the liquid crystal molecule has a strong vertical dielectric constant, which effectively improves the deformation of the liquid crystal molecule under a flexure electric field. In this way the liquid crystal molecule has a lower flexure electric effect, so that the scintillation is improved. At the same time the liquid crystal molecule belongs to a positive molecule, which has a small rotational viscosity, and a short response time.

The term "independently selected" means that the selection of a parameter is independent each time it occurs. In the at least three organic compounds, R1 may be the same or different from each other; R2 may be the same or different from each other;

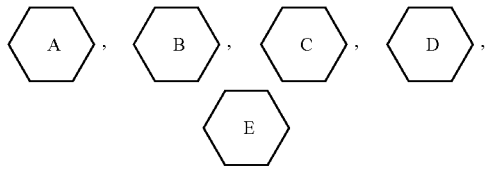

may be the same or different from each other.

For example, in the liquid crystal composition provided by at least one embodiment of the present disclosure, the liquid crystal composition comprises at least three organic compounds having a general formula of:

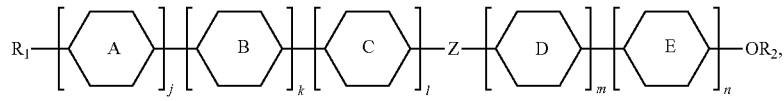

in which $R_1$ is selected from C1 to C3 alkyl or C2 to C3 alkenyl; $R_2$ is selected from C1 to C2 alkyl or $CF_3$;

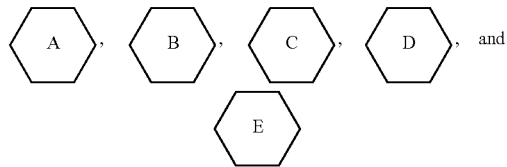

are independently selected from

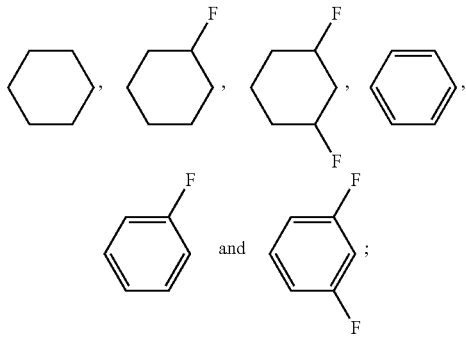

j, k and m are independently selected from 0 and 1; l and n are 1; and Z is selected from a single bond or $CF_2O$.

The liquid crystal material needs to have a good chemical stability, a thermal stability and a stability to an electric field and an electromagnetic radiation. In addition to the above stabilities, it would be advantageous for the liquid crystal material of a thin film transistor liquid crystal display (TFT-LCD) to have one or more of the following properties: a wide nematic temperature range, a suitable birefringence anisotropy, a high resistivity, a good UV resistance, a high charge retention and a low steam pressure.

In order to achieve a high quality display and eliminate the remnant and tail of the display screen for a dynamic screen display application such as a liquid crystal TV, the liquid crystal composition needs to have a fast response speed, and thus the liquid crystal needs to have a low rotational viscosity γ1. In addition, in order to reduce the energy consumption of the device, the driving voltage of the liquid crystal is desired to be as low as possible. Therefore, improving dielectric anisotropy Δε of the liquid crystal composition is of great significance.

It should be note that, the rotational viscosity γ1 of the liquid crystal is decreased by introducing a difluoromethylene oxy linker (—$CF_2O$—) into the liquid crystal monomer. Due to the dipole moment of the difluoromethylene oxy linker (—$CF_2O$—) and the dipole moment of the end-group fluoride atom, the dielectric anisotropy Δε of the liquid crystal molecule is increased.

For example, the liquid crystal composition has a fluid viscosity of from about 8 cP to 15 cP.

For example, the liquid crystal composition has a fluid viscosity of from about 9 cP to 13 cP.

For example, the liquid crystal composition has a fluid viscosity of about 8 cP, 10 cP, 11 cP, 12 cP, 14 cP or 15 cP.

In example 1, the liquid crystal composition comprises:

having a mass percentage of 15%;

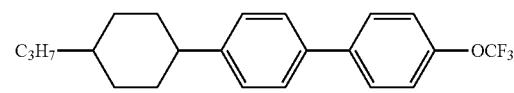

having a mass percentage of 15%;

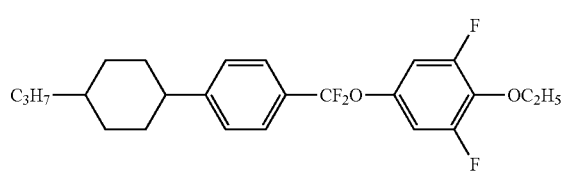

having a mass percentage of 20%;

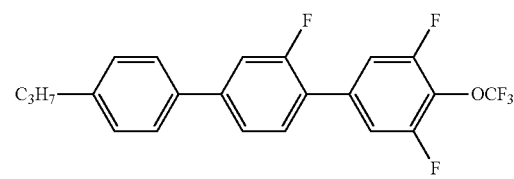

having a mass percentage of 15%;

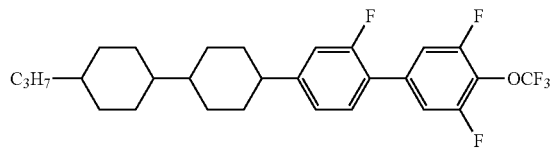

having a mass percentage of 10%;

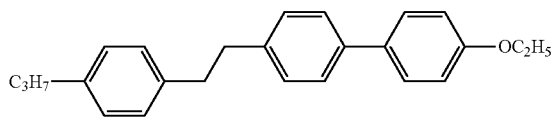

having a mass percentage of 15%; and

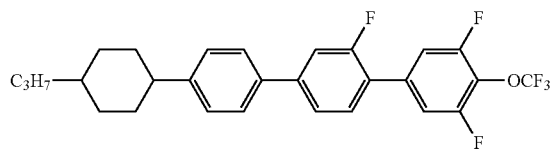

having a mass percentage of 10%.

The liquid crystal composition in example 1 is tested and the data obtained are as follows:

The fluid viscosity is: 15 cP.

The optical anisotropy $\Delta n=0.108$ ($\Delta n=ne-no$, in which no is the refractive index of ordinary light and ne is the refractive index of extraordinary light).

The dielectric anisotropy $\Delta\varepsilon=5.5$ ($\Delta\varepsilon=\varepsilon///-\varepsilon\bot$, in which $\varepsilon//$ is the dielectric constant parallel to the molecular axis, and $\varepsilon\bot$ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=82° C.

The rotation viscosity γ1=87 mPa·s, and the test temperature is 25±0.5° C.

The melting point of the liquid crystal from crystalline to nematic phase: S—N(° C.)≤−30° C.

Defoaming can be done under vacuum 50 Pa within 10 minutes, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. The bubbles are completely defoamed within 10 minutes. That is to say, a complete defoaming is determined by observing that bubbles disappear and no new bubble is produced in the glass bottle.

In example 2, the liquid crystal composition comprises:

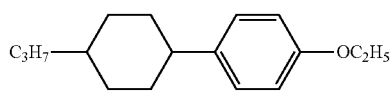

having a mass percentage of 20%;

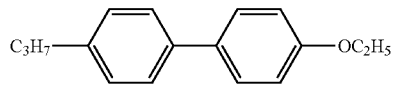

having a mass percentage of 20%;

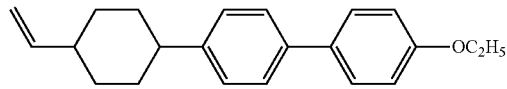 [SMILES: C=CC1CCC(c2ccc(-c3ccc(OCC)cc3)cc2)CC1]

having a mass percentage of 15%;

having a mass percentage of 15%;

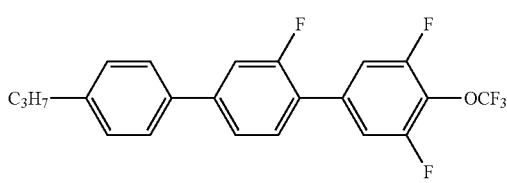

having a mass percentage of 15%; and

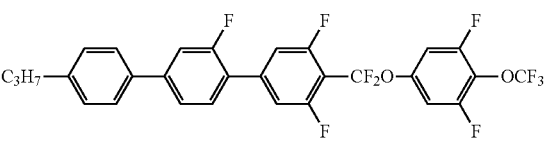

having a mass percentage of 15%.

The liquid crystal composition in example 2 is tested and the data obtained are as follows:

The fluid viscosity is: 13 cP.

The optical anisotropy $\Delta n=0.118$ ($\Delta n=ne-no$, in which no is the refractive index of ordinary light and ne is the refractive index of extraordinary light).

The dielectric anisotropy $\Delta\varepsilon=6.1$ ($\Delta\varepsilon=\varepsilon///-\varepsilon\bot$, in which $\varepsilon//$ is the dielectric constant parallel to the molecular axis, and $\varepsilon\bot$ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=84° C.

The rotation viscosity γ1=91 mPa·s, and the test temperature is 25±0.5° C.

The melting point of the liquid crystal from crystalline to nematic phase: S—N(° C.)≤−30° C.

Defoaming can be done under vacuum 50 Pa within 10 minutes, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. The bubbles are completely defoamed within 10 minutes. That is to say, a complete defoaming is determined by observing that bubbles disappear and no new bubble is produced in the glass bottle.

In example 3, the liquid crystal composition comprises:

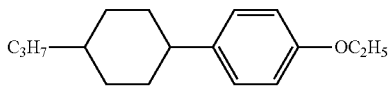

having a mass percentage of 40%;

having a mass percentage of 30%; and

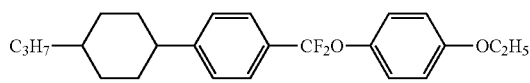

having a mass percentage of 30%.

The liquid crystal composition in example 3 is tested and the data obtained are as follows:

The fluid viscosity is: 9 cP.

The optical anisotropy Δn=0.082 (Δn=ne-no, in which no is the refractive index of ordinary light and ne is the refractive index of extraordinary light).

The dielectric anisotropy Δε=4.3 (Δε=ε//−ε⊥, in which ε// is the dielectric constant parallel to the molecular axis, and ε⊥ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=73° C.

The rotation viscosity γ1=62 mPa·s, and the test temperature is 25±0.5° C.

The melting point of the liquid crystal from crystalline to nematic phase: S—N(° C.)≤−30° C.

Defoaming can be done under vacuum 50 Pa within 10 minutes, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. The bubbles are completely defoamed within 10 minutes. That is to say, a complete defoaming is determined by observing that bubbles disappear and no new bubble is produced in the glass bottle.

In example 4, the liquid crystal composition comprises:

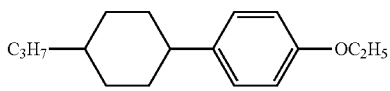

having a mass percentage of 30%;

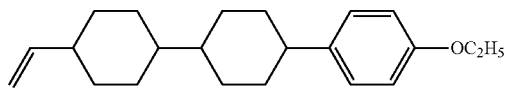 [SMILES: C=CC1CCC(C2CCC(c3ccc(OCC)cc3)CC2)CC1]

having a mass percentage of 30%;

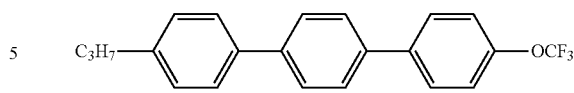

having a mass percentage of 20%; and

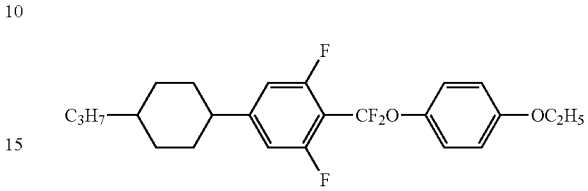

having a mass percentage of 20%.

The liquid crystal composition in example 4 is tested and the data obtained are as follows:

The fluid viscosity is: 11 cP.

The optical anisotropy Δn=0.094 (Δn=ne-no, in which no is the refractive index of ordinary light and ne is the refractive index of extraordinary light).

The dielectric anisotropy Δε=7.2 (Δε=ε//−ε⊥, in which ε// is the dielectric constant parallel to the molecular axis, and ε⊥ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=78° C.

The rotation viscosity γ1=71 mPa·s, and the test temperature is 25±0.5° C.

The melting point of the liquid crystal from crystalline to nematic phase: S—N(° C.)≤−20° C.

Defoaming can be done under vacuum 50 Pa within 10 minutes, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. The bubbles are completely defoamed within 10 minutes. That is to say, a complete defoaming is determined by observing that bubbles disappear and no new bubble is produced in the glass bottle.

In example 5, the liquid crystal composition comprises:

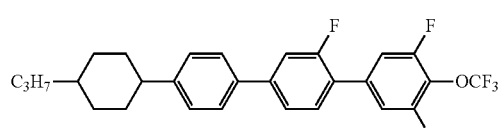

having a mass percentage of 25%;

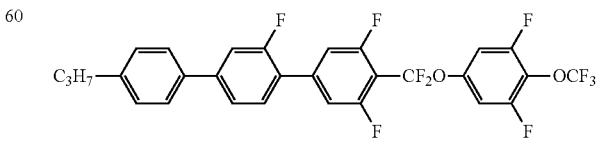

having a mass percentage of 25%;

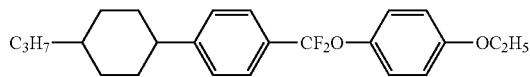

having a mass percentage of 30%; and

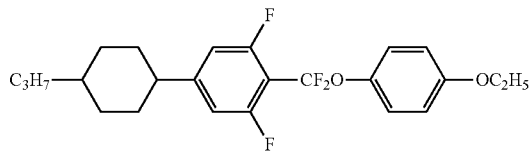

having a mass percentage of 20%.

The liquid crystal composition in example 5 is tested and the data obtained are as follows:

The fluid viscosity is: 11 cP.

The optical anisotropy Δn=0.098 (Δn=ne-no, in which no is the refractive index of ordinary light and ne is the refractive index of extraordinary light).

The dielectric anisotropy Δε=6.8 (Δε=ε//−ε⊥, in which ε// is the dielectric constant parallel to the molecular axis, and ε⊥ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=76° C.

The rotation viscosity γ1=76 mPa·s, and the test temperature is 25±0.5° C.

The melting point of the liquid crystal from crystalline to nematic phase: S—N(° C.)≤−25° C.

Defoaming can be done under vacuum 50 Pa within 8 minutes, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. The bubbles are completely defoamed within 8 minutes. That is to say, a complete defoaming is determined by observing that bubbles disappear and no new bubble is produced in the glass bottle.

In example 6, the liquid crystal composition comprises:

having a mass percentage of 15%;

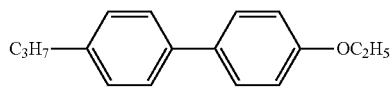

having a mass percentage of 15%;

having a mass percentage of 20%;

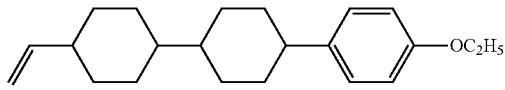

having a mass percentage of 10%;

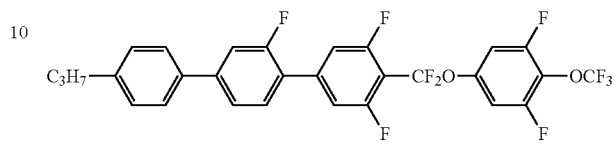

having a mass percentage of 20%; and

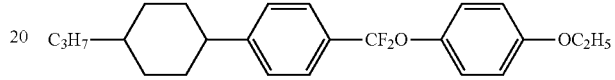

having a mass percentage of 20%.

The liquid crystal composition in example 6 is tested and the data obtained are as follows:

The fluid viscosity is: 14 cP.

The optical anisotropy Δn=0.114 (Δn=ne-no, in which no is the refractive index of ordinary light and ne is the refractive index of extraordinary light).

The dielectric anisotropy Δε=6.8 (Δε=ε//−ε⊥, in which ε// is the dielectric constant parallel to the molecular axis, and ε⊥ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=86° C.

The rotation viscosity γ1=95 mPa·s, and the test temperature is 25±0.5° C.

The melting point of the liquid crystal from crystalline to nematic phase: S—N(° C.)≤−30° C.

Defoaming can be done under vacuum 50 Pa within 7 minutes, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. The bubbles are completely defoamed within 7 minutes. That is to say, a complete defoaming is determined by observing that bubbles disappear and no new bubble is produced in the glass bottle.

In example 7, the liquid crystal composition comprises:

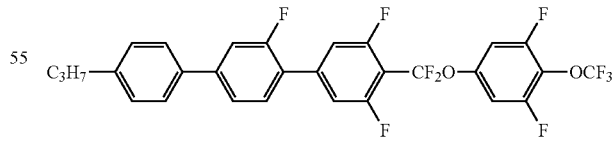

having a mass percentage of 15%;

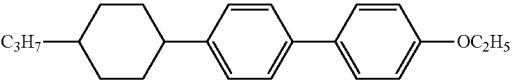

having a mass percentage of 15%;

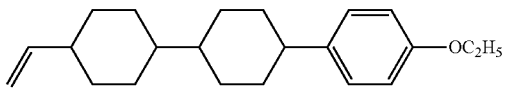 [SMILES: C=CC1CCC(C2CCC(c3ccc(OCC)cc3)CC2)CC1]

having a mass percentage of 20%;

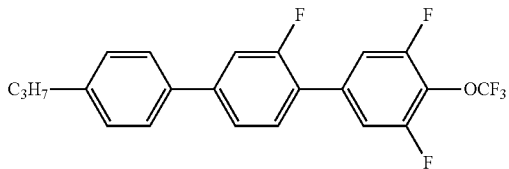

having a mass percentage of 15%;

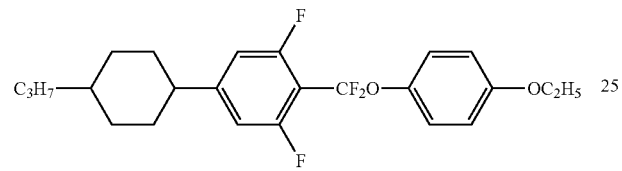

having a mass percentage of 10%;

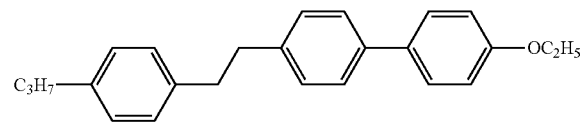

having a mass percentage of 15%;

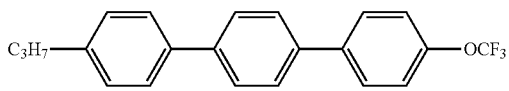

having a mass percentage of 10%; and

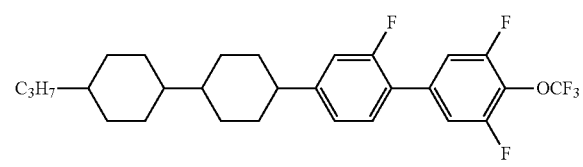

having a mass percentage of 10%.

The liquid crystal composition in example 7 is tested and the data obtained are as follows:

The fluid viscosity is: 15 cP.

The optical anisotropy Δn=0.134 (Δn=ne-no, in which no is the refractive index of ordinary light and ne is the refractive index of extraordinary light).

The dielectric anisotropy Δε=7.9 (Δε=ε//−ε⊥, in which ε// is the dielectric constant parallel to the molecular axis, and ε⊥ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=82° C.

The rotation viscosity γ1=93 mPa·s, and the test temperature is 25±0.5° C.

The melting point of the liquid crystal from crystalline to nematic phase: S—N(° C.)≤−30° C.

Defoaming can be done under vacuum 50 Pa within 6 minutes, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. The bubbles are completely defoamed within 6 minutes. That is to say, a complete defoaming is determined by observing that bubbles disappear and no new bubble is produced in the glass bottle.

In comparative example 1, the liquid crystal composition comprises:

having a mass percentage of 15%;

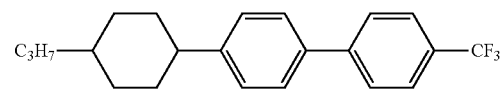

having a mass percentage of 15%;

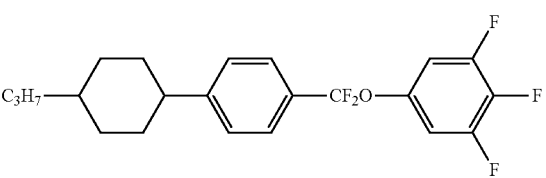

having a mass percentage of 20%;

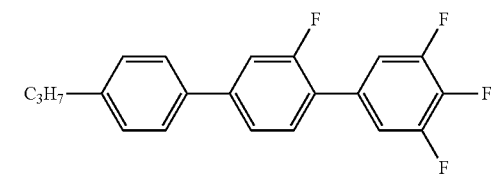

having a mass percentage of 15%;

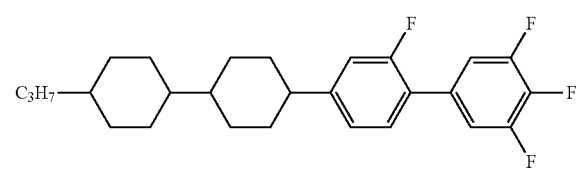

having a mass percentage of 10%;

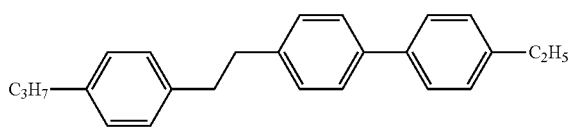

having a mass percentage of 15%;

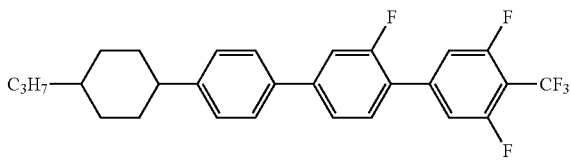

and having a mass percentage of 10%.

The liquid crystal composition in comparative example 1 is tested and the data obtained are as follows:

The fluid viscosity is: 21 cP.

The optical anisotropy Δn=0.107 (Δn=ne-no, in which no is the refractive index of ordinary light and ne is the refractive index of extraordinary light).

The dielectric anisotropy Δε=5.2 (Δε=ε//−ε⊥, in which ε// is the dielectric constant parallel to the molecular axis, and ε⊥ is the dielectric constant perpendicular to the molecular axis, and the test conditions are 25±0.5° C., 1 KHz, HP4284A Precision LCR Meter, and a 5.2 micronmeter TN left-handed cell).

The clearing point Cp=80° C.

The rotation viscosity γ1=78 mPa·s, and the test temperature is 25±0.5° C.

The melting point of the liquid crystal from crystalline to nematic phase: S—N(° C.)≤−20° C.

Defoaming is conducted for 2 hours at vacuum 50 pa, and the defoaming process is as follows: adding 300 g of the liquid crystal composition into a 500 ml glass bottle, opening the glass bottle and placing it into a filling machine, and observing bubbles escaping from the glass bottle under vacuum 50 Pa. There are still bubbles after 2 hours of defoaming. That is to say, bubbles are always observed in the glass bottle.

By comparing examples 1-7 with comparative example 1, it can be seen that the liquid crystal composition provided by the embodiments of the present disclosure has a small fluid viscosity, and all the monomers in the liquid crystal composition contain an ether structure or an ether-like structure, which reduces the solubility of air and nitrogen in the liquid crystal composition. Bubbles are seldom generated in the process of assembling the two substrates of the liquid crystal display panel. Furthermore, the liquid crystal composition has a small surface tension and a small fluid viscosity, and the gas dissolved in the liquid crystal can easily escape under the vacuum condition. Thus, the efficiency of the assembling process is greatly improved, that is, the liquid crystal composition can achieve a good defoaming effect without adding any defoamer.

For example, the liquid crystal composition provided in the embodiments of the present disclosure can be applied to a plurality of types of displays, electro-optic devices, sensors, and the like. There are many kinds of liquid crystal compounds useful for these display fields, among which the nematic liquid crystal is the most widely used. The nematic liquid crystal is used in a passive TN matrix display, a STN matrix display and a system having a TFT active matrix.

At least one embodiment further provides a manufacturing method of any one of the liquid crystal compositions described above, and the manufacturing method comprises: mixing components in the liquid crystal composition and heating to obtain the liquid crystal composition.

For example, the specific method of manufacturing the liquid crystal composition is: mixing the components in the liquid crystal composition according to the ingredients and the mass percentages in the above examples; adding the liquid crystal composition to a glass bottle; heating the liquid crystal composition to 60° C.; magnetically stirring or mechanically stirring for 1 h; and then obtaining the liquid crystal composition which is mixed uniformly. The liquid crystal composition obtained is in a form of liquid.

For example, the components are mixed and heated to allow them to be completely dissolved. Alternatively, all the components are dissolved in an appropriate organic solvent, and the solvent is removed after the components being completely mixed to form the liquid crystal composition which is mixed uniformly.

For example, the formation of the liquid crystal monomers is generally monitored by a TLC. The treatment after the reaction usually comprises water washing, extraction, drying after combining organic phases, evaporating solvent under vacuum, recrystallization and performing a column chromatography process. Those skilled in the art are able to obtain various liquid crystal monomers in the above embodiments of the present disclosure in a routine method.

For example, the liquid crystal composition does not comprise a defoaming agent, that is, a defoaming effect can be achieved without any defoaming agent. Furthermore, the liquid crystal composition provided in the embodiment of the present disclosure has a better defoaming effect than other liquid crystal compositions comprising a defoaming agent, and has a shorter defoaming time.

At least one embodiment of the present disclosure further provides a display panel, and the display panel comprises any one of the liquid crystal compositions described above, a first substrate and a second substrate, in which the liquid crystal composition is sandwiched between the first substrate and the second substrate.

For example, the first substrate is an array substrate and the second substrate is a color filter substrate. FIG. 1 is a schematic diagram of a local top view structure of an array substrate in an IPS-mode liquid crystal panel provided by an embodiment of the present disclosure; and FIG. 2 is a schematic diagram of a section structure along a line A-A in FIG. 1, and the structure of the color filter substrate and liquid crystal 300 is shown in FIG. 2.

Figure 2:
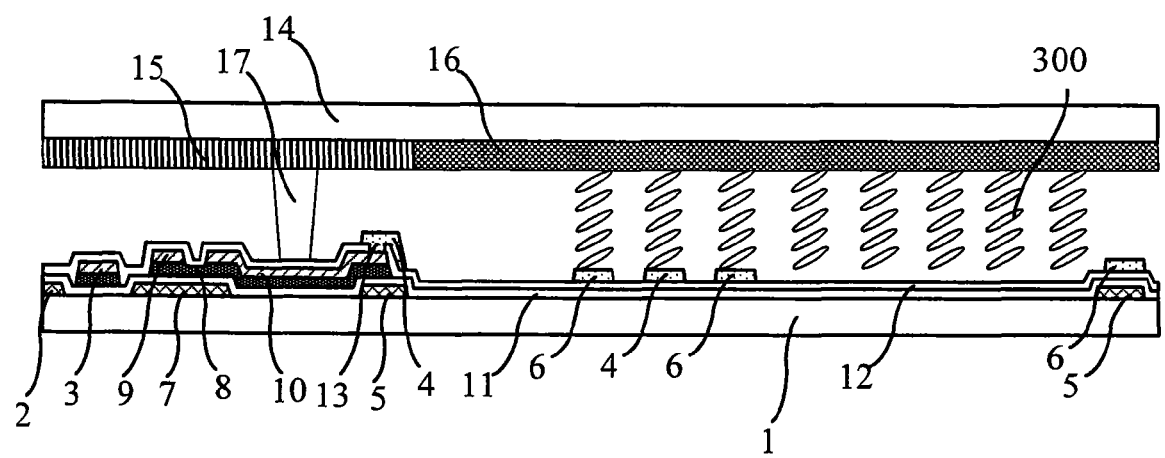
FIG. 2 schematically shows a section structure along a line A-A in FIG. 1.

As illustrated in FIG. 1 and FIG. 2, the array substrate comprises the first substrate 1, the first substrate 1 is provided with a plurality of data lines 3 and a plurality of gate scanning lines 2 which are intersected vertically and horizontally. The plurality of data lines 3 and the plurality of gate scanning lines 2 surround an array of a plurality of pixel units, FIG. 1 and FIG. 2 show a structure in a pixel unit. Each of the pixel units comprises a thin film transistor (TFT), a pixel electrode 4, a common electrode line 5 and a common electrode 6. The TFT specifically comprises a gate electrode 7, an active layer 8, a source electrode 9 and a drain electrode 10. The gate electrode 7 connects to the gate scanning line 2. The source electrode 9 connects to the data line 3. The drain electrode 10 connects to the pixel electrode 4 for applying a working voltage to the pixel electrode 4. The common electrode line 5 is connected to the common electrode 6 for applying a common voltage to the common electrode 6. Both the pattern of the pixel electrode 4 and the pattern of the common electrode 6 are in a shape of a comb. Both the pixel electrode 4 and the common electrode 6 comprise a plurality of narrow slots, and the pattern of the pixel electrode 4 and the pattern of the common electrode 6 match with each other by concave and convex. The conductive films are insulated with each other by a gate insulation layer 11 and a passivation layer 12. Common electrode line 5 is usually formed in the same layer with the gate scanning line 2, and the common electrode line 5 is connected to the common electrode 6 by a via hole 13. The pixel electrode 4 is arranged at a different layer from the common electrode line 5 and the gate scanning line 2. In a direction perpendicular to a main surface of the array substrate, storage capacitances are formed between the pixel electrode 4 and the common electrode line 5 and between the pixel electrode 4 and the gate scanning line 2 to maintain an electric field in a gap of each frame of display. As illustrated in FIG. 2, the color filter substrate usually comprises a second base substrate 14, and a pattern of a black matrix layer 15 and a color filter resin layer 16 is formed on the second base substrate 14. A spacer 17 is usually formed on a region corresponding to the black matrix layer 15 of the color filter substrate, and the spacer 17 is used for keeping a distance between the color filter substrate and the array substrate which are assembled, that is, to keep a thickness of a cell. The color filter substrate and the array substrate are named according to films formed on them. Both the color filter substrate and the array substrate can be collectively referred to as display substrates.

For example, a display manner of the liquid crystal includes a twisted nematic mode (TN), a supertwisted nematic mode (STN), an optical compensation bending mode (OCB), an in-plane switching display (IPS), an fringe field switching display (FFS), a vertical alignment mode (VA), an axisymmetric microstructured liquid crystal display (ASM), a multi-domain twisted liquid crystal display, etc.

For example, the display panel is an IPS-type display panel, an FFS-type display panel, a TN-type display panel, a STN-type display panel, or an OCB-type display panel.

At least one embodiment of the present disclosure further provides a display device, and the display device comprises any one of the display panels described above. For example, the display device is a display element such as a liquid crystal display, an electronic paper, and an organic light-emitting diode (OLED) display, or a television, a digital camera, a mobile phone, a watch, a tablet computer, a notebook computer, a navigation system including the display element, or any other product or component having a display function.

Embodiments of the present disclosure provide a liquid crystal composition, its manufacturing method, a display panel and a display device having the following beneficial effects. All the monomers in the liquid crystal composition contain an ether structure or an ether-like structure, which reduces the solubility of air and nitrogen in the liquid crystal composition. Bubbles are seldom generated in the process of assembling the two substrates of the liquid crystal display panel. Furthermore, the liquid crystal composition has a small surface tension and a small fluid viscosity, and the gas dissolved in the liquid crystal can easily escape under the vacuum condition. Thus, the efficiency of the assembling process is greatly improved, that is, the liquid crystal composition can achieve a good defoaming effect without adding any defoamer.

Please note that:

(1) the drawings of the embodiments of the present disclosure are only related to the structures mentioned in the embodiments of the present disclosure, and other structures can be further obtained by general designs;

(2) for the sake of clarity, in the drawings for describing the embodiments of the present disclosure, sizes of layers or regions are not drawn according to an actual scale but are exaggerated or diminished; it will be understood that when an element such as a layer, a film, a region or a substrate is referred to as being "on" or "under" another element, the element may be "directly" disposed "on" or "under" another element, or there may be an intermediate element;

(3) the embodiments of the present disclosure and the features therein can be combined with each other to obtain new embodiments in the absence of conflicts.

What are described above is related to only the illustrative embodiments of the present disclosure and not limitative to the protection scope of the present application. The protection scope of the present application shall be defined by the accompanying claims.

What is claimed is:
1. A liquid crystal composition,
wherein
the liquid crystal composition comprises:

having a mass percentage of about 15%;

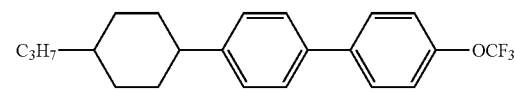

having a mass percentage of about 15%;

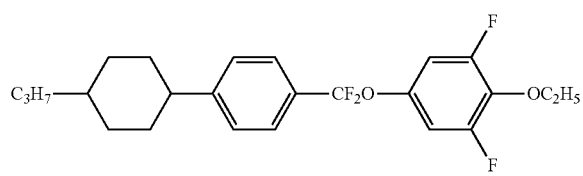

having a mass percentage of about 20%;

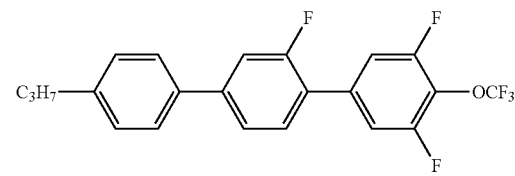

having a mass percentage of about 15%;

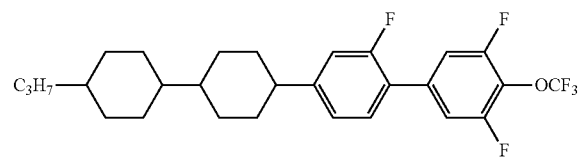

having a mass percentage of about 10%;

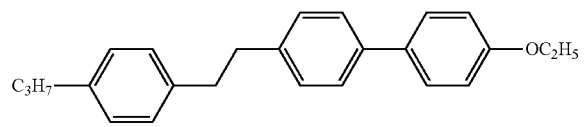

having a mass percentage of about 15%; and

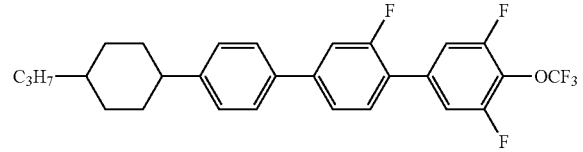

having a mass percentage of about 10%; or
the liquid crystal composition comprises:

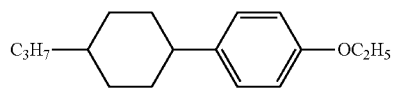

having a mass percentage of about 20%;

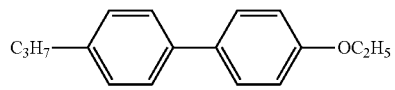

having a mass percentage of about 20%;

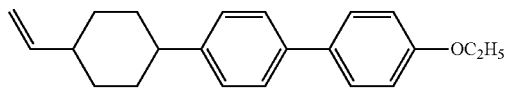 [SMILES: C=CC1CCC(c2ccc(-c3ccc(OCC)cc3)cc2)CC1]

having a mass percentage of about 15%;

having a mass percentage of about 15%;

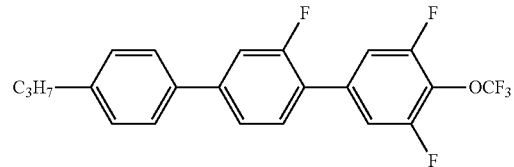

having a mass percentage of about 15%; and

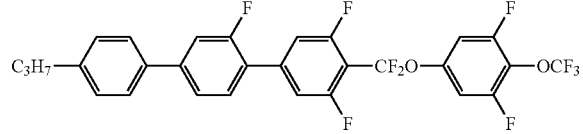

having a mass percentage of about 15%; or
the liquid crystal composition comprises:

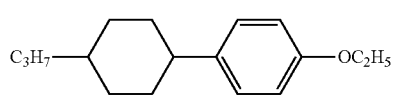

having a mass percentage of about 40%;

having a mass percentage of about 30%; and

having a mass percentage of about 30%; or
the liquid crystal composition comprises:

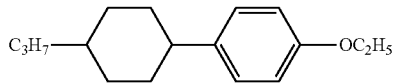

having a mass percentage of about 30%;

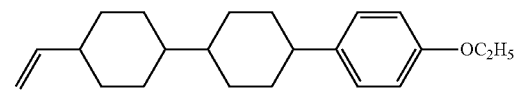 [SMILES: C=CC1CCC(C2CCC(c3ccc(OCC)cc3)CC2)CC1]

having a mass percentage of about 30%;

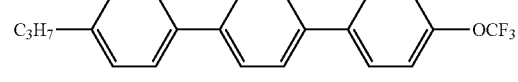

having a mass percentage of about 20%; and

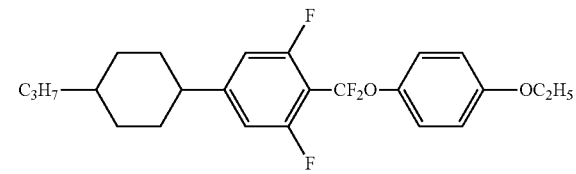

having a mass percentage of about 20%; or
the liquid crystal composition comprises:

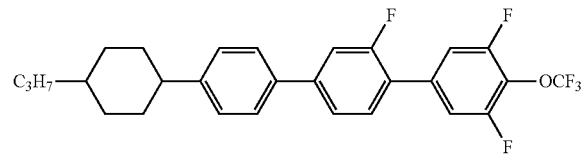

having a mass percentage of about 25%;

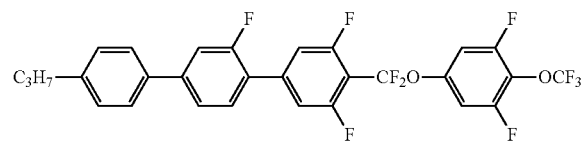

having a mass percentage of about 25%;

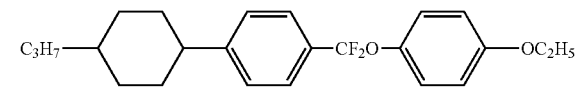

having a mass percentage of about 30%; and

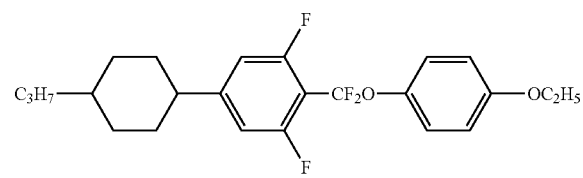

having a mass percentage of about 20%; or
the liquid crystal composition comprises:

having a mass percentage of about 15%;

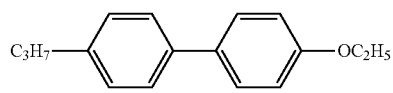

having a mass percentage of about 15%;

having a mass percentage of about 20%;

having a mass percentage of about 10%;

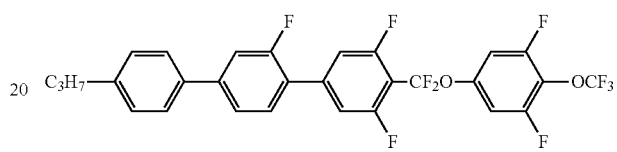

having a mass percentage of about 20%; and

having a mass percentage of about 20%.

2. The liquid crystal composition according to claim 1, wherein the liquid crystal composition has a fluid viscosity of from about 8 cP to 15 cP.

3. The liquid crystal composition according to claim 2, wherein the liquid crystal composition has a fluid viscosity of from about 9 cP to 13 cP.

4. The liquid crystal composition according to claim 3, wherein the liquid crystal composition has a fluid viscosity of about 10 cP, 11 cP or 12 cP.

5. A method manufacturing of the liquid crystal composition according to claim 1, comprising: mixing components in the liquid crystal composition and heating to obtain the liquid crystal composition.

6. The manufacturing method according to claim 5, wherein the liquid crystal composition includes no defoaming agent.

7. A display panel, comprising the liquid crystal composition according to claim 1.

8. A display device, comprising: the display panel according to claim 7.

* * * * *